(12) United States Patent
Fuchs

(10) Patent No.: US 8,272,605 B2
(45) Date of Patent: Sep. 25, 2012

(54) SECURE ACCESSORY ATTACHMENT SYSTEM FOR OUTDOOR FREE-STANDING UMBRELLAS

(76) Inventor: Mark Fuchs, Mequon, WI (US)

( * ) Notice: Subject to any disclaimer, the term of this patent is extended or adjusted under 35 U.S.C. 154(b) by 386 days.

(21) Appl. No.: 12/484,003

(22) Filed: Jun. 12, 2009

(65) Prior Publication Data
US 2010/0314524 A1    Dec. 16, 2010

(51) Int. Cl.
*F16M 11/38*    (2006.01)
*A45F 3/44*    (2006.01)

(52) U.S. Cl. ..... 248/166; 248/156; 248/159; 248/122.1; 248/410

(58) Field of Classification Search .......... 248/156, 248/314, 166, 159, 122.1, 125.1, 161, 410, 248/412, 353, 533, 170, 171, 545, 530
See application file for complete search history.

(56) References Cited

U.S. PATENT DOCUMENTS

| | | | | |
|---|---|---|---|---|
| 2,597,157 A * | 5/1952 | Martino | ......................... | 248/150 |
| 2,817,548 A * | 12/1957 | Uthemann | ................... | 403/104 |
| 2,849,249 A * | 8/1958 | Fridolph | ....................... | 403/376 |
| 3,194,403 A * | 7/1965 | Van Horn, Jr. | .................. | 211/78 |
| 3,332,654 A * | 7/1967 | Jacobson | ...................... | 211/107 |
| 3,685,162 A * | 8/1972 | Haun | .............................. | 33/295 |
| 3,899,098 A | 8/1975 | Hutchins | | |
| 4,210,286 A | 7/1980 | Smitherman | | |
| 4,744,690 A * | 5/1988 | Hsieh | ........................... | 403/104 |
| 4,878,642 A | 11/1989 | Kirby, Jr. | | |
| 4,953,819 A * | 9/1990 | Davis | ......................... | 248/227.3 |
| 5,002,252 A * | 3/1991 | Setala et al. | ................... | 248/533 |
| 5,505,645 A * | 4/1996 | Engler, Jr. | ......................... | 441/1 |
| 5,823,496 A | 10/1998 | Foley et al. | | |
| 5,937,881 A * | 8/1999 | Villa | ............................. | 135/20.1 |
| 5,947,138 A * | 9/1999 | DeAngelis | ...................... | 135/16 |
| 6,443,172 B2 | 9/2002 | Brumfield | | |
| 6,675,819 B2 | 1/2004 | Arrowood et al. | | |
| 7,275,668 B1 | 10/2007 | Carroll | | |
| 7,475,859 B2 * | 1/2009 | Selders | ......................... | 248/304 |
| 7,533,854 B2 * | 5/2009 | Aube | ............................. | 248/95 |
| 2002/0185167 A1 * | 12/2002 | Lin et al. | ......................... | 135/16 |
| 2007/0137681 A1 * | 6/2007 | Tatz | ............................... | 135/16 |
| 2010/0207429 A1 * | 8/2010 | Quinn | ......................... | 297/16.1 |

* cited by examiner

*Primary Examiner* — Anita M King
(74) *Attorney, Agent, or Firm* — Absolute Technology Law Group, LLC

(57) ABSTRACT

The present invention is a stable, customizable umbrella system which includes one or more surface mount components which may be fixedly or selectively attached to an umbrella support pole.

4 Claims, 6 Drawing Sheets

SECURE ACCESSORY ATTACHMENT SYSTEM FOR OUTDOOR FREE-STANDING UMBRELLAS

FIELD OF INVENTION

The present invention relates to the field of outdoor free-standing umbrellas and more particularly to a customizable umbrella system for selectively attaching accessories to an umbrella without compromising the stability of the umbrella.

GLOSSARY

Figure 1:
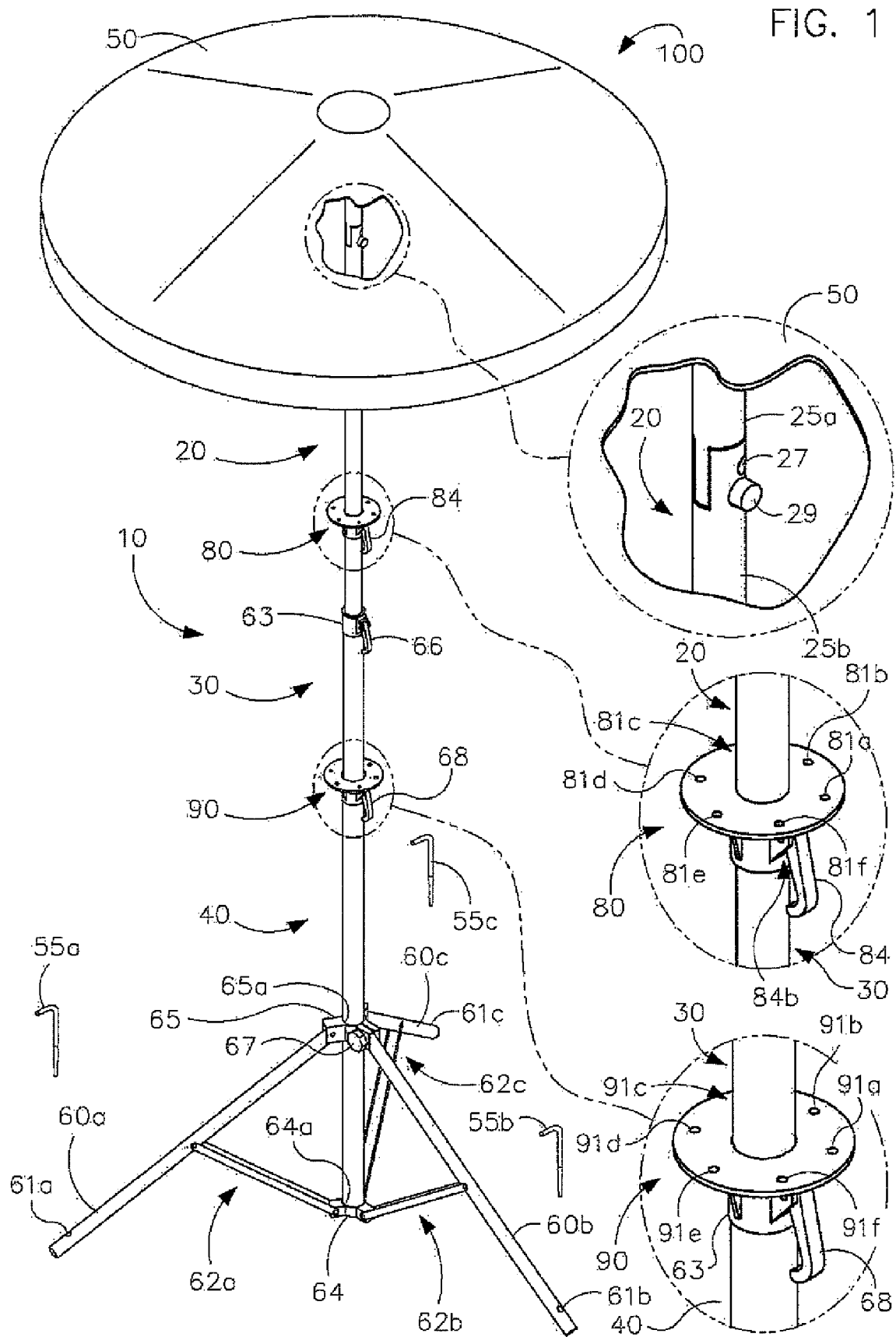
FIG. 1 illustrates an exemplary embodiment of a customizable umbrella system.

As used herein, the term "support pole" means the pole to which an umbrella is attached. A support pole may be comprised of one or multiple components or members. Members may be hinged or telescoping, and made of wood, aluminum, plastic or any other material known in the art.

As used herein, the term "telescoping member" means one of two or more component parts, at least one of which has a diameter or circumference wider than the others to permit a component to move slidably for extension or placement. Telescoping members may be tubular, rectangular or irregularly shaped or contoured.

As used herein, the term "surface mount component" means a component that can be fixedly or removably attached to a support pole.

As used herein, the term "cam lever" means a moveable component that moves another component from a secured to a released position (e.g., by toggling or rotationally).

As used herein, the term "pressure pad" means a component which is utilized for applying pressure. In various embodiments, a pressure pad may include grooves, ridges, or other configurations which enhances the pressure pad's gripping capabilities.

As used herein, the term "accessory" means a hook, brace, bracket, protuberance, mounting plate, magnetic plate, contoured frame, receptacle, or any other component known in the art for suspending or holding any object which a user elects to selectively attach or use in conjunction with a support pole.

As used herein, the term "leg member" means a structural support component. In various embodiments, a leg member may be collapsing, telescoping, foldable or having any other structure that allows it to be compacted for transportation and storage.

As used herein, the term "supporting leg member" means a structure which is used to provide additional support to a leg member and/or support pole As used herein, the term "hinge component" means a structural component that connects two or more components and allows one component to move relative to another (e.g., at an angle of rotation). A hinge component may include, but is not limited to, a pivot hinge, butt/mortise hinge, a continuous hinge, a concealed hinge, a butterfly or parliament hinge, a strap hinge, a counter flap hinge, a flush hinge, a coach hinge, a spring hinge, a tee hinge, a friction hinge, or any other hinging component known in the art.

BACKGROUND

The umbrella market is a multi-billion dollar a year industry, with over 3.25 billion units sold worldwide annually. Consumers may buy several umbrellas for different functions and view them as expendable accessories. Umbrellas are relatively inexpensive items, and consumers are willing to replace or upgrade them as new styles and functionality become available.

Outdoor umbrellas are used for recreation, to enhance outdoor seating and as tools (e.g., for photographers).

A beach (or outdoor) umbrella is generally evaluated at the point of purchase by a user for its cost, convenience, stability, portability and increased functionality over other umbrellas.

It is desirable to offer an outdoor umbrella accessory system with customizable accessory components that can be inexpensively modified or offered separately to appeal to a diverse market of recreational and professional users of outdoor umbrella systems.

SUMMARY OF THE INVENTION

The present invention is a customizable umbrella system which includes one or more surface mount components which may be fixedly or selectively attached to an umbrella support pole.

In various embodiments, the support pole may consist of multiple telescoping members which allow for height adjustment and are secured in place by cam levers and pressure pads. The support pole may also include a hinged component allowing the umbrella to be positioned at an angle. The customizable umbrella system may further include a tripod base with leg members and support members. In addition, leg members may be collapsible for transportation and storage. Surface mount components for supporting accessory components are also secured to support pole by cam levers and pressure pads and may be affixed to support pole or may be selectively movable.

DETAILED DESCRIPTION OF INVENTION

For the purpose of promoting an understanding of the present invention, references are made in the text to exemplary embodiments of a customizable umbrella system, only some of which are described herein. It should be understood that no limitations on the scope of the invention are intended by describing these exemplary embodiments. One of ordinary skill in the art will readily appreciate that alternate but functionally equivalent components and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of a customizable umbrella system 100. In the embodiment shown, customizable umbrella system 100 is comprised of support pole 10 having three telescoping members—upper telescoping member 20, middle telescoping member 30 and lower telescoping member 40. In the embodiment shown, upper telescoping member 20 has a smaller diameter than middle telescoping member 30 so that upper telescoping member 20 fits inside middle telescoping member 30. Similarly, middle telescoping member 30 has a smaller diameter than lower telescoping member 40 so that middle telescoping member 30 fits inside lower telescoping member 40. Upper telescoping member 20 may be separated from middle telescoping member 30 for storage.

In alternate embodiments, customizable umbrella system 100 may have fewer or more telescoping members or may utilize hinged or folding components as telescoping members.

Customizable umbrella system 100 further includes collapsing legs 60a, 60b and 60c. The upper end of collapsing legs 60a, 60b, 60c are mounted in leg bracket 65, which is a support structure attached to lower telescoping member 40. Leg bracket 65 has aperture 65a which accommodates lower telescoping member 40. The positioning of leg bracket 65 on lower telescoping member 40 may be adjusted allowing collapsing legs 60a, 60b, 60c to be pivoted downward and collapsed for storage, i.e., when leg bracket 65 is moved up lower telescoping member 40 collapsing legs 60a, 60b, 60c pivot downward.

In the embodiment shown, collapsing legs 60a, 60b, 60c further include an aperture 61a, 61b, 61c near the bottom. Apertures 61a, 61b, 61c are sized to accommodate a ground stake 55a, 55b, 55c which provide extra stability in windy conditions.

When customizable umbrella system 100 is in its assembled position, leg bracket 65 is secured to lower telescoping member 40 using tension dial 67 located on leg bracket 65. Tension dial 67 is loosened to collapse collapsing legs 60a, 60b, 60c.

In the embodiment shown, supporting leg members 62a, 62b, 62c provide additional support to collapsing legs 60a, 60b, 60c. Supporting leg members 62a, 62b, 62c radiate outward from base bracket 64. Base bracket 64 has aperture 64a which accommodates lower telescoping member 40. In the embodiment shown, base bracket 64 is located at the bottom of lower telescoping member 40, however, in other embodiments, base bracket 64 may be located at a position on lower telescoping member 40 other than the bottom.

In the embodiment shown, pole cam levers 66 and 68 are used to adjust the height of support pole 10. In the embodiment shown, pole cam lever 66 is affixed to collar 63 which is affixed to the top of middle telescoping member 30. When pole cam lever 66 is in the released position, upper telescoping member 20 can be placed inside middle telescoping member 30. Pole cam lever 66 further includes pressure pad 66b (not shown), which presses into upper telescoping member 20 when pole cam lever 66 is moved to the secured position securing upper telescoping member 20 to middle telescoping member 30 when the desired height is reached.

Pole cam lever 68 is attached to affixed surface mount component 90 which is fixedly attached to the top of lower telescoping member 40. When pole cam lever 68 is in the released position, middle telescoping member 30 can be moved inside lower telescoping member 40. Pole cam lever 68 further includes pressure pad 68b (not shown), which presses into middle telescoping member 30 when pole cam lever 68 is moved to the secured position securing middle telescoping member 30 to lower telescoping member 40 when the desired height is reached. In other embodiments, pole cam lever 68 is not attached to affixed surface mount component 90 but rather is affixed to a collar (similar to collar 63).

In other embodiments, customizable umbrella system 100 may have more or fewer than two pole cam levers 66, 68.

Umbrella 50 (which is a canvas umbrella structure known in the art) is located at the top of upper telescoping member 20. Umbrella 50 is attached to upper telescoping member 20 and opened and closed by means known in the art.

In the embodiment shown, upper telescoping member 20 includes hinged components 25a and 25b which are interlocking pivotal components secured by a rivet 27, and used to selectively position umbrella 50. When push-button 29 is depressed, hinged component 25a is pivoted in relation to hinged component 25b tilting umbrella 50.

Customizable umbrella system 100 further includes movable surface mount component 80 and affixed surface mount component 90. In the embodiment shown, movable surface mount component 80 is located on upper telescoping member 20 directly above collar 63. In other embodiments, movable surface mount component 80 may be selectively positioned anywhere along upper telescoping member 20. Movable surface mount component 80 is secured to upper telescoping member 20 by accessory cam lever 84 and pressure pad 84b. In other embodiments, there may be fewer or more movable surface mount components (with accessory cam levers and pressure pads).

In the embodiment shown, affixed surface mount component 90 is fixedly attached to the top of lower telescoping member 40. In other embodiments, affixed surface mount component 90 may be separately or integrally molded with upper telescoping member 20, middle telescoping member 30 or lower telescoping member 40. Affixed surface mount component 90 contains cam lever 68 and pressure pad 68b (not shown) which secure middle telescoping member 30 to lower telescoping member 40. In other embodiments, there may be fewer or more affixed surface mount components located on upper telescoping member 20, middle telescoping member 30, and lower telescoping member 40.

Moveable surface mount component 80 and affixed surface mount component 90 are capable of receiving a plurality of functional accessory components (not shown). In the embodiment shown, movable and affixed surface mount components 80, 90 includes a multitude of apertures 81a, 81b, 81c, 81d, 81e, 81f and 91a, 91b, 91c, 91d, 91e, 91f for suspending a plurality of accessory components, including but not limited to hooks and accessories for suspending or mounting apparel and towels, beverage holders, electronic device holders, cosmetic and medication cases, lighting, photographic equipment, books and/or items which must be protected from outdoor elements. In various embodiments, accessory components may be lighted, phosphorescent, locked, tamperresistant, water resistant or electronic. An accessory component may be a receptacle, hook, bracket, brace, protuberance, mounting plate, magnetic plate, contoured frame or any other mounting component or receptacle known in the art for holding food, beverages, personal, cosmetic, machine or human-readable and/or electronic items.

Figure 2:
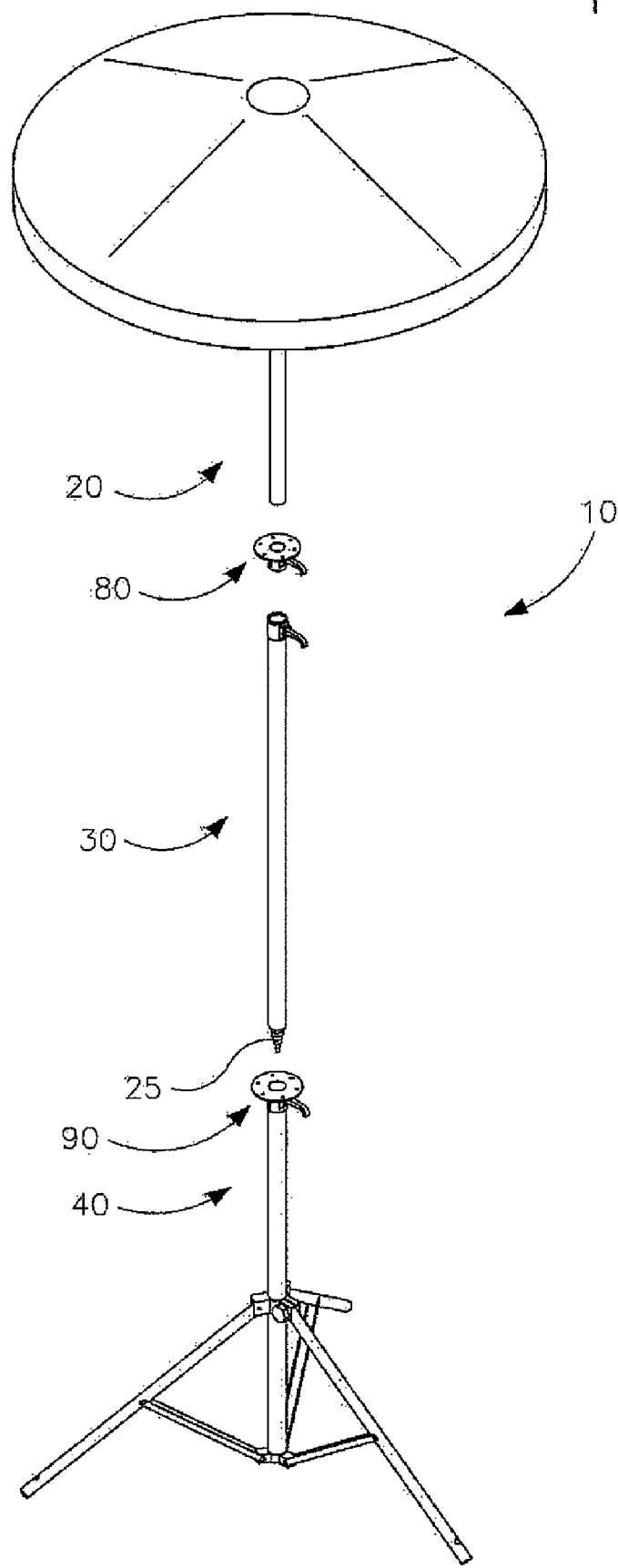
FIG. 2 shows an exemplary embodiment of a support pole.

FIG. 2 shows an exemplary embodiment of support pole 10 comprised of three telescoping members: upper telescoping member 20, middle telescoping member 30 and lower telescoping member 40. In the embodiment shown, upper telescoping member 20 has a smaller diameter than middle telescoping member 30 so that upper telescoping member 20 fits inside middle telescoping member 30. Also visible in FIG. 2 is an optional sand screw 25. Also shown in FIG. 2 are movable surface mount component 80 and affixed surface mount component 90.

Figure 3:
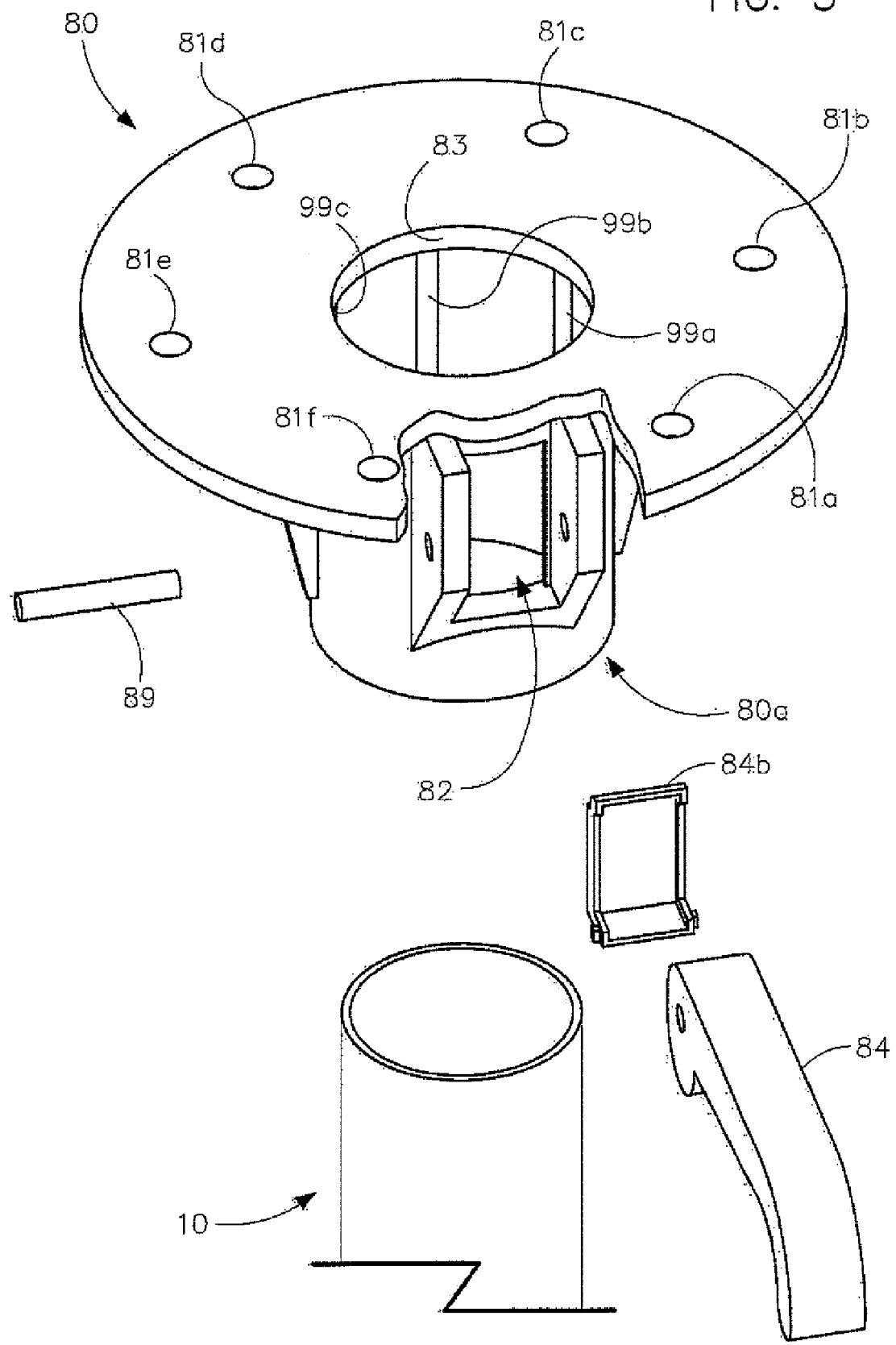
FIG. 3 shows an exploded view of a movable surface mount component of a customizable umbrella system.

FIG. 3 shows an exploded view of movable surface mount component 80. In the embodiment shown, movable surface mount component 80 is circular. In other embodiments, movable surface mount component 80 may be square, rectangular, asymmetrical, or any other shape capable of being removably attached to support pole 10. Movable surface mount component contains recess 82 for accessory cam lever 84, aperture 80a to accommodate support pole 10 (of a diameter to fit either upper telescoping member 20, middle telescoping member 30 or lower telescoping member 40), and apertures 81a, 81b, 81c, 81d, 81e, 81f. In the embodiment shown, apertures 81a, 81b, 81c, 81d, 81e, 81f are circular. In other embodiments, apertures may be slots, oval-shaped, square or any other shape or configuration capable of supporting an accessory.

Movable surface mount component 80 further contains flange 83 and ridges 99a, 99b, 99c on the interior of aperture 80a. Ridges 99a, 99b, 99c match the width of flange 83. In other embodiments, there are more or fewer apertures, ridges, or both. Also shown in FIG. 3 are rivet 89 and pressure pad 84b.

Figure 4A:
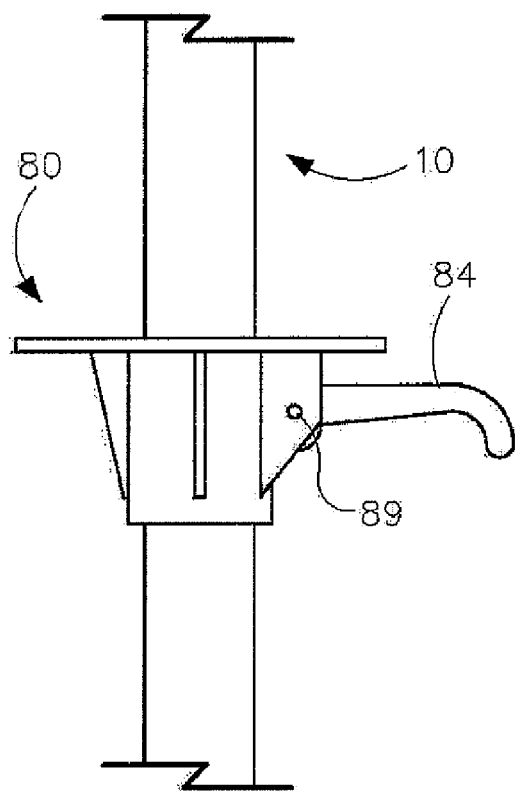
FIG. 4A shows a side view of a movable surface mount component positioned on a support pole with accessory cam lever in the released position.

FIG. 4A shows movable surface mount component 80 positioned on support pole 10 with accessory cam lever 84 in the released position which allows the position of movable surface mount component 80 to be adjusted. Accessory cam lever 84 pivots on rivet 89.

Figure 4B:
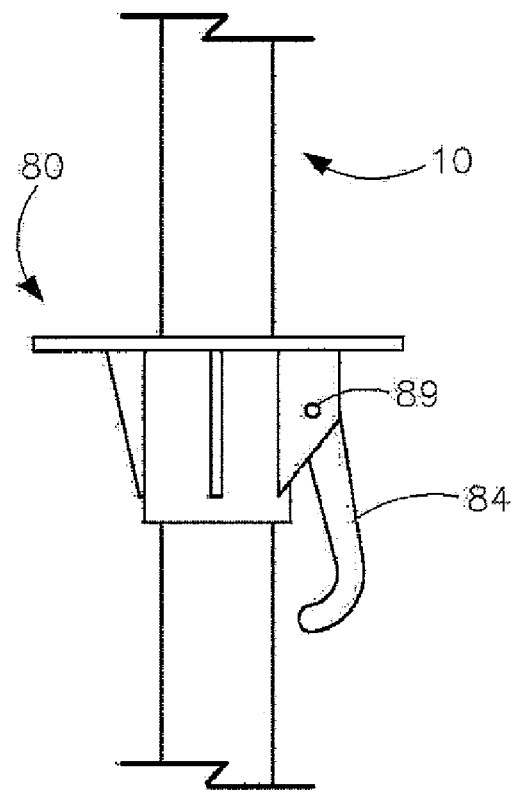
FIG. 4B shows a side view of a movable surface mount component positioned on a support pole with accessory cam lever in the secured position.

FIG. 4B shows movable surface mount component 80 positioned on support pole 10 with accessory cam lever 84 in the secured position. When accessory cam lever 84 is in the secured position, movable surface mount component 80 is secured to support pole 10. The position of movable surface mount component 80 may not be adjusted until accessory cam lever 84 is moved to the released position. Accessory cam lever 84 pivots on rivet 89.

Figure 5:
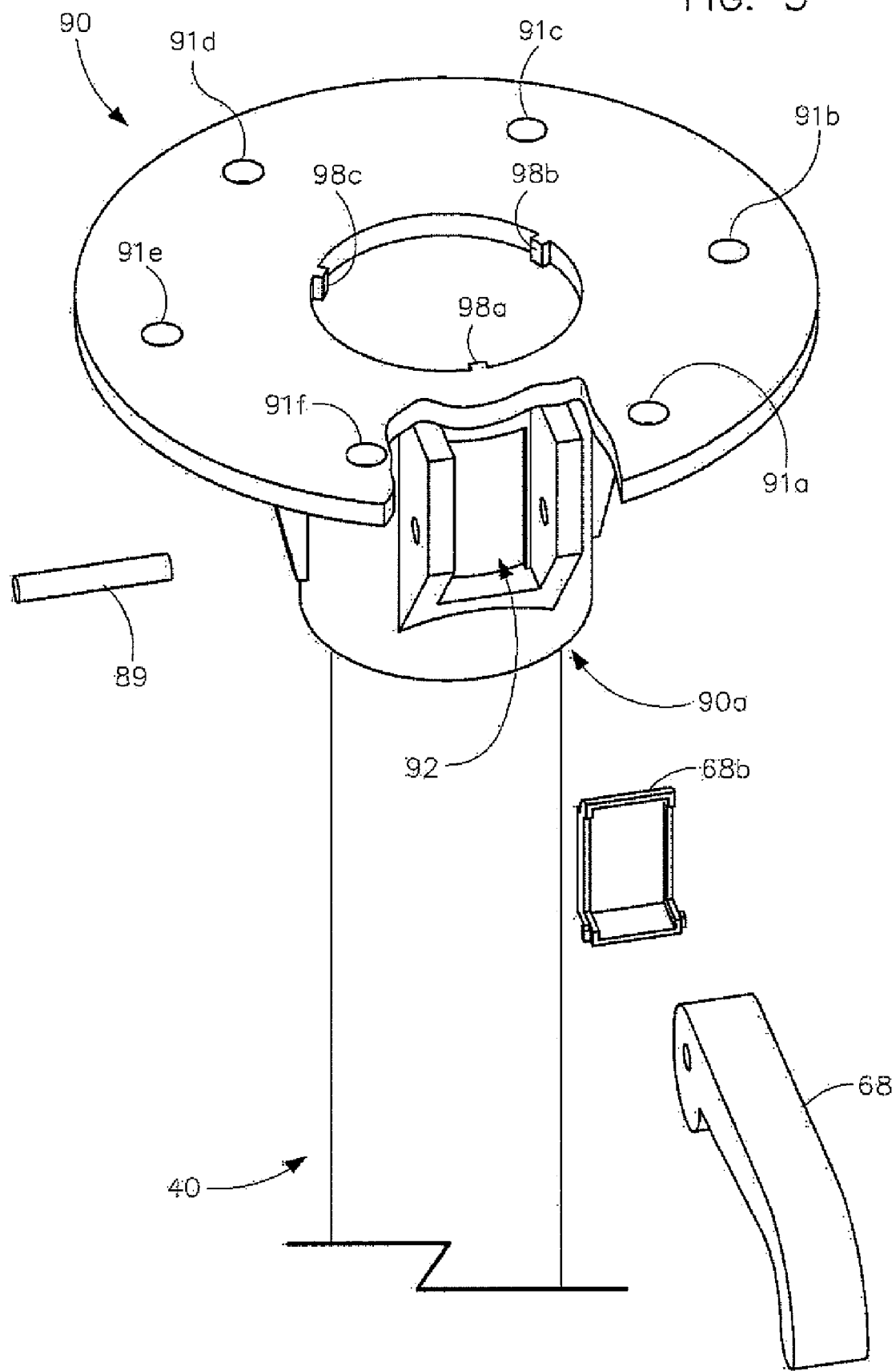
FIG. 5 shows an exploded view of an affixed surface mount component.

FIG. 5 shows an exploded view of affixed surface mount component 90. In the embodiment shown, affixed surface mount component 90 is circular. In other embodiments, affixed surface mount component 90 may be square, rectangular, asymmetrical, or any other shape capable of being fixedly attached to support pole 10. Affixed surface mount component 90 contains recess 92 for pole cam lever 68, aperture 90a to accommodate support pole 10 (of a diameter to fit either upper telescoping member 20, middle telescoping member 30 or lower telescoping member 40), and apertures 91a, 91b, 91c, 91d, 91e, 91f. In the embodiment shown, apertures 91a, 91b, 91c, 91d, 91e, 91f are circular. In other embodiments, apertures may be slots, oval-shaped, square or any other shape or configuration capable of supporting an accessory.

Movable surface mount component 90 further contains protuberances 98a, 98b, 98c on the interior of aperture 80a. In the embodiment shown, affixed surface mount component 90 secures middle telescoping member 30 (not shown) to lower telescoping member 40 and is affixed to lower telescoping member 40. Protuberances 98a, 98b, 98c act as a bridge between the interior aperture 80a (roughly the diameter of lower telescoping member 40) and the smaller diameter of the middle telescoping member 30. In other embodiments, there may be more or fewer protuberances. Also shown is rivet 89.

Figure 6:
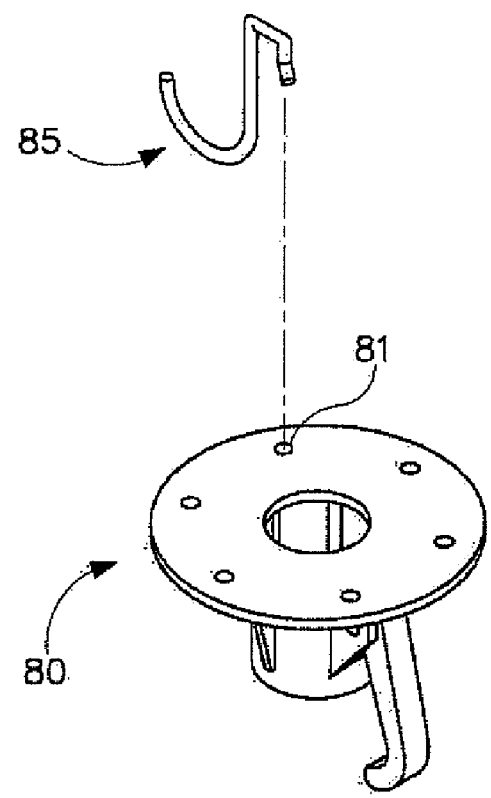
FIG. 6 shows a side view of an optional accessory hook.

FIG. 6 shows a side view of an optional accessory hook 85 which can be selectively attached to either movable surface mount component 80 via aperture 81 or to affixed surface mount component 90 (not shown) via aperture 91 (not shown). Optional accessory hook 85 may be used to hang towels, clothing, purses, etc.

Figure 7:
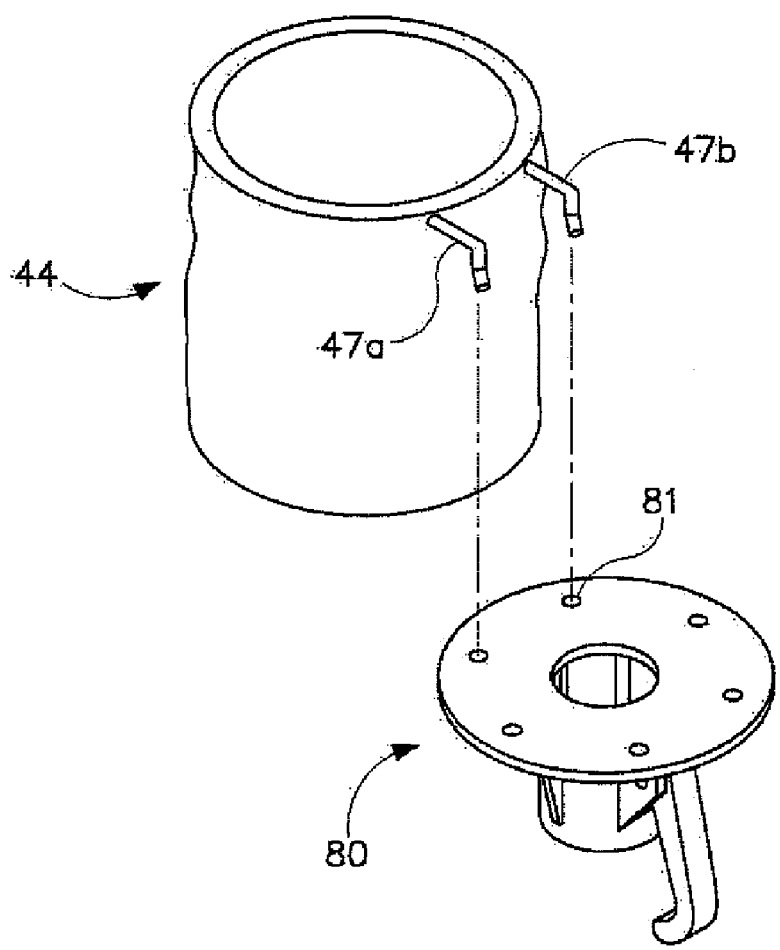
FIG. 7 shows a side view of an optional accessory beverage cup.

FIG. 7 shows a side view of optional accessory beverage cup 44 having complementary hook components 47a and 47b. Complementary hook components 47a and 47b are complementary to apertures 81 of movable surface mount component and apertures 91 of affixed surface mount component 90 allowing optional accessory beverage cup 44 to be selectively attached.

What is claimed is:

1. A customizable umbrella system comprised of:
   a support pole having at least one telescoping member having an upper end and a lower end;
   a base member adapted to receive said lower end of said at least one telescoping member;
   a vertically movable leg bracket fitting around said base member;
   a plurality of pivotally collapsible legs, each of said plurality of pivotally collapsible legs having one end pivotally attached to said vertically movable leg bracket;
   wherein said vertically movable leg bracket further includes a tension dial;
   wherein each of said plurality of pivotally collapsible legs further includes a ground stake aperture;
   a collar affixed to said at least one telescoping member, said collar having a cam lever which presses into an upper telescoping member when said cam lever is moved to the secured position, locking said upper telescoping member to a lower telescoping member;
   at least one surface mount component, which fits around said at least one telescoping member, having at least one structural component for mounting at least one accessory selected from the group consisting of hooks, receptacles, brackets, braces, protuberances, mounting plates, magnetic plates, and contoured frames; and
   an umbrella affixed to the top of said upper telescoping member;
   wherein said upper telescoping member further includes at least one hinged component to pivotally attach said umbrella to the top of said upper telescoping member,
   wherein said at least one hinged component is configured with a push-button, wherein said push-button releases said at least one hinged component allowing it to rotate and position said umbrella at an angle.

2. The customizable umbrella system of claim 1 wherein said at least one surface mount component is fixedly attached to said support pole.

3. The customizable umbrella system of claim 1 wherein said at least one surface mount component is selectively attached to said support pole so that it is axially movable along said support pole and may be positioned at varying heights then secured in place by a cam lever and pressure pad.

4. The customizable umbrella system of claim 1 wherein said at least one surface mount component has at least one aperture.

* * * * *